Feb. 18, 1969  C. O. GLASGOW  3,428,086
THROTTLING VALVE

Filed May 16, 1966  Sheet 1 of 2

INVENTOR.
CLARENCE O. GLASGOW
BY
Dunlap and Laney
ATTORNEYS

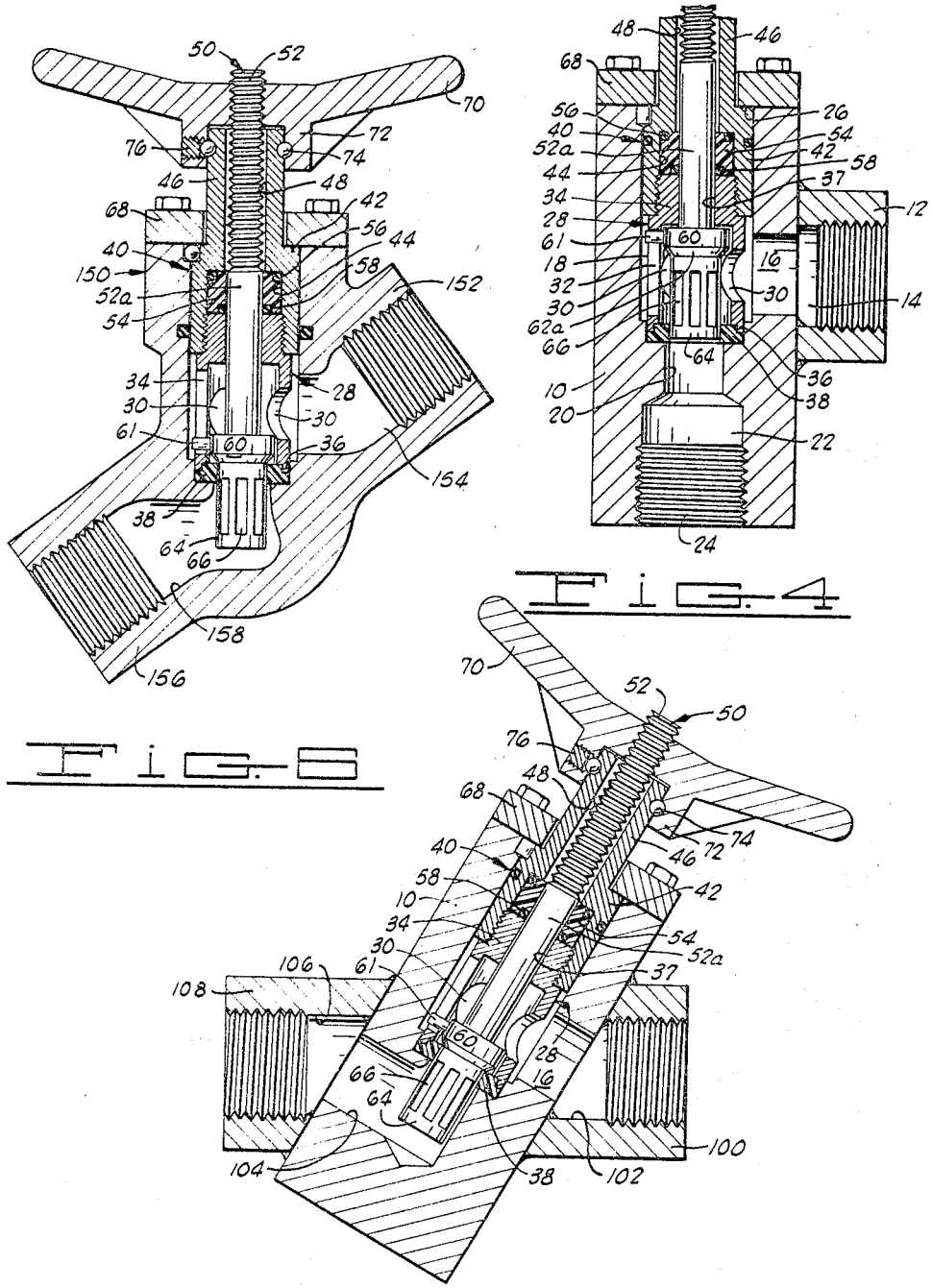

United States Patent Office 3,428,086
Patented Feb. 18, 1969

3,428,086
THROTTLING VALVE
Clarence O. Glasgow, 2620 S. Yorktown,
Tulsa, Okla. 74114
Filed May 16, 1966, Ser. No. 550,524
U.S. Cl. 137—625.3          14 Claims
Int. Cl. F16k 1/06, 1/26

ABSTRACT OF THE DISCLOSURE

A throttling valve including a valve body having a central chamber, a stem opening into the central chamber, an inlet port and an outlet port. The outlet port is aligned with the stem opening and extends at 90° to the direction that the inlet port opens into the central chamber. A stationary cage is positioned in the central chamber and has a stem aperture aligned with the stem opening in the body, a discharge aperture aligned with the outlet port in the body, and fluid flow passageways in the wall of the cage. A valve seat is positioned in the body adjacent the cage and aligned with the outlet port. A valve stem extends through the stem opening into the stationary cage and carries at its end inside the valve body, a valve closure member positioned to sealingly cooperate with the seat as the stem is reciprocated in the valve body. Secured to the valve closure member on the opposite side thereof from the stem is a hollow, cylindrical movable cage having a discharge opening in one end thereof aligned with the discharge port in the valve body, and having a plurality of circumferentially spaced radial ports in the side thereof. The movable cage is contacted around its outer periphery by the valve seat during operation of the valve.

---

This invention relates to a throttling valve. More particularly, the invention relates to a throttling valve adapted for use in high pressure service where a pressure drop of large magnitude exists across the valve, and the movable valve elements of the valve are subjected to forces generated by turbulence and cavitation, which forces tend to set up vibration and chattering within the valve.

In the use of certain types of throttling valves, a very substantial pressure drop is developed across the valve and the fluid flow through the valve from the inlet port to the outlet port undergoes a change of course through an angle of approximately 90°. These conditions of use impose damaging forces upon the movable valve member located in the valve body and used to open and close the valve in that the high pressure drop and change of course cause chattering of a suspended or cantilevered type valve stem where used, and the high pressure fluid, in passing at a very high flow rate through the valve, and through a change of direction of about 90°, tends to cut or wear away parts of the valve stem and valve seat, and the internal cage structure where one is provided.

The present invention provides an improved throttling valve which is especially well adapted for use in high pressure service in which a large pressure drop is developed across the valve, and in which the valve is opened and closed by the use of a reciprocating valve member carried on an elongated stem. Broadly described, the invention includes a valve body having a central chamber and having a stem opening through said valve body into said central chamber. The valve body is further provided with an inlet port through the valve body opening into the central chamber, and an outlet port opening into the central chamber from a direction oriented at substantially 90° to the direction that the inlet port opens into the central chamber. The outlet port is aligned with the stem opening in the valve body.

The throttling valve further includes a stationary cage positioned in the central chamber in the valve body and having a stem aperture aligned with the stem opening in the valve body and a discharge aperture at the opposite side of the stationary cage from the stem aperture. The stationary cage further has fluid flow passageways in the wall of the cage and located between the stem aperture and the discharge aperture. A valve seat is positioned in the central chamber of the valve body in juxtaposition to the stationary cage and has an opening therethrough which is aligned with the discharge aperture in the stationary cage and the outlet port of the valve body. Valve stem means is positioned in the central chamber of the valve body for reciprocation therein, and the stem means extends through the stem opening in the valve body and the stem aperture in the stationary cage. The stem means includes a valve closure member positioned to sealingly cooperate with the valve seat as the stem means is reciprocated in the valve body, and further includes a hollow, generally cylindrical, movable internal cage having a discharge opening in one end thereof, the discharge opening being aligned with the discharge port in the valve body. The movable internal cage further has a plurality of circumferentially spaced radial ports in the side thereof which are positioned in the stem means so that they become aligned with the fluid flow passageways in the stationary cage when the stem means is reciprocated to an "open" position in the valve body. Finally, the valve includes valve operator means which is located outside of the valve body and cooperates with the valve stem means so as to reciprocate the stem means in the valve body when the operator is manipulated.

An important feature in the present invention is the construction and location of the valve stem means, and particularly the movable internal cage which constitutes one of the elements of the stem means. This generally cylindrical, movable internal cage is dimensioned to constantly bear against, and be in contact with, the valve seat which is provided in the central chamber of the valve body, and this cooperation between the valve seat and the movable internal cage, coupled with the provision of a packing which is spaced from the valve seat and also cooperates with another portion of the reciprocating valve stem means, assures that the valve stem means is not permitted to chatter or vibrate during the operation of the valve. The construction of the valve cage to include a plurality of circumferentially spaced radial ports, and preferably at least four of such ports, assures that fluid flow into this internal cage, followed by discharge through the open end of the movable internal cage, will occur in such a way that a considerable amount of the kinetic energy of the fluid moving through the valve at a high flow rate is dissipated in turbulence and does not act to abrade or cut the seat of the valve.

From the foregoing general and summary description of the invention, it will have become apparent that it is a broad major object of the present invention to provide an improved throttling valve which is characterized in having a substantially extended service life as compared to valves of this general type as they have been previously constructed.

Another object of the invention is to provide a throttling valve of the type which can be used in high pressure service where the fluid passing through the valve undergoes a very large pressure drop across the valve without the valve elements excessively vibrating or chattering in the course of such usage.

An additional object of the invention is to provide a throttling valve of the type used in a service where a high fluid pressure drop occurs across the valve, which valve resists abrasion or damage to the valve seat as a result of high flow rates and large pressure drops.

An additional object of the present invention is to provide a throttling valve which can be economically constructed, is simple to maintain and repair, and which functions effectively in high pressure service applications where the fluid flow is diverted through a sharp angle in the course of passage through the valve.

In addition to the foregoing described objects and advantages, additional objects and advantages will become apparent as the following detailed description is read in conjunction with the accompanying drawings which illustrate the invention.

In the drawings:

FIGURE 4 is a view similar to FIGURE 1, but showing the valve in its open position.

FIGURE 5 is a vertical sectional view through a modified throttling valve constructed in accordance with the present invention.

FIGURE 6 depicts a vertical sectional view taken through the center of yet another embodiment of the present invention.

Figure 1:
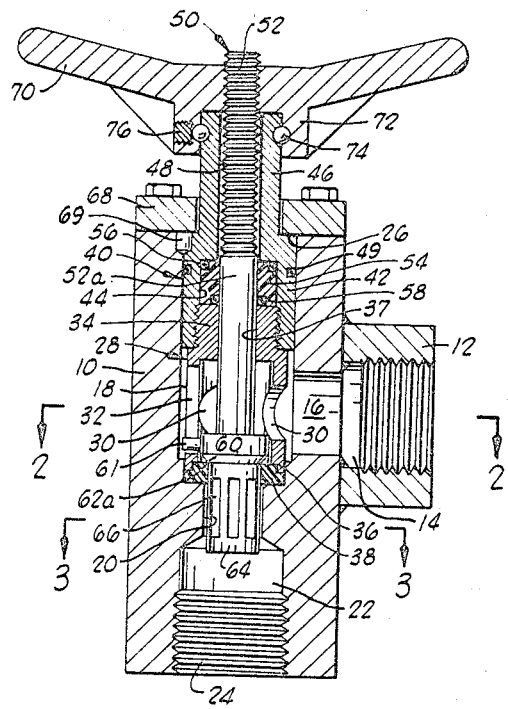
FIGURE 1 is a vertical sectional view through the center of a throttling valve constructed in accordance with one embodiment of the present invention, and showing the valve in its closed position.
Figure 2:
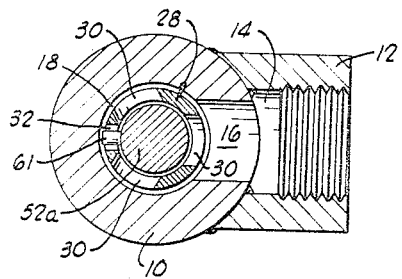
FIGURE 2 is a sectional view taken along line 2—2 of FIGURE 1.

Referring now to the drawings in detail and particularly to FIGURE 1, the throttling valve of the invention includes a valve body 10 which has welded, or otherwise suitably secured, to one side thereof, an internally threaded inlet fitting 12. The inlet fitting 12 has a bore 14 therethrough which communicates with an inlet port 16 opening through the side of the valve body 10. The inlet port 16 communicates with a preferably cylindrical central chamber 18 formed within the valve body 10. The central chamber 18 also is in communication with an outlet port 20 which connects the central chamber to a bore 22 in the body 10 carrying an internal thread 24. It will be noted that the outlet port 20 opens into the central chamber 18 in a direction which extends at substantially a right angle to the direction at which the inlet port 16 opens into the central chamber.

In the illustrated embodiment of the invention, the central chamber 18 opens at the opposite side of the valve body 10 from the side containing the bore 22 and the outlet port 20, and this opening of the central chamber may be termed a stem opening and is designated by reference numeral 26.

Positioned within the central chamber 18 is a lower stationary cage designated generally 28 which, in the illustrated embodiment, is generally cylindrical in configuration and is characterized in having a hollow interior which communicates with the central chamber 18 of the valve body 10 through a plurality of generally circular fluid flow passageways 30 and through an open lower end. In the form of the valve depicted, three of the fluid flow passageways 30 are provided in the lower stationary cage 28 and are spaced circumferentially from each other around the cage. The lower stationary cage 28 is further provided with a keyway slot 32 formed in the side thereof between two of the fluid flow passageways 30 and functioning for a purpose hereinafter described. The lower stationary cage 28 has an externally threaded neck portion 34 at the upper end thereof, and an axially extending, annular flange 36 at the opposite end thereof. The neck portion 34 has a bore 37 therethrough which communicates with the hollow interior of the lower stationary cage for a purpose hereinafter explained and the neck portion 34 forms a radially inwardly extending annular shoulder in the cage above the flow passageways 30. The axially extending annular flange 36 mates with an annular groove formed around the outer periphery of an annular valve seat 38 which is positioned between the portion of the valve body 10 which defines the lower end of the central chamber 18 and the lower end of the stationary cage 28.

An upper stationary cage, designated generally by reference character 40, threadedly engages the externally threaded neck 34 of the lower stationary cage 28 and includes a relatively large diameter internal portion 42 having a counterbore 44 formed therein and a relatively small diameter neck portion 46 which projects through the stem opening 26 in the body 10 and contains an elongated cylindrical bore 48 which is of smaller diameter than the counterbore 44. It will be noted that bore 48 and counterbore 44 are coaxially aligned with the bore 37 through the neck portion 34 of the lower stationary cage 28. An O-ring 49 or other suitable sealing member is provided between the internal portion 42 of the upper stationary cage 40 and the valve body 10.

Stem means designated generally by reference character 50 is reciprocally mounted in the valve body 10 and includes an elongated externally threaded stem 52 which is positioned partially in, and projects from, the bore 48 formed in the small diameter neck portion 46 of the upper stationary cage 40. The diameter of the elongated externally threaded stem 52 is such that the threads of the stem clear the surrounding portions of the upper stationary cage 40 which define the bore 48. The stem 52 also includes a smooth walled portion 52a which extends through a packing member 54 which is seated in the counterbore 44 of the upper stationary cage 40 and may be constructed of rubber or similar material, but is preferably constructed of a synthetic resin, such as Teflon or Delrin. The packing member 54 forms a fluid tight seal around the smooth walled portion 52a of the stem 52. An O-ring 56 can be provided in a groove in the packing member to better seal the packing member, when it is constructed of a synthetic resin, against the counterbore-defining walls of the upper stationary cage 40. A quad ring 58 is preferably provided in a suitable groove in the packing adjacent the stem portion 52a. The elongated stem 52 is secured at its end opposite the end which is threaded to an annular valve member 60 which carries a radially extending pin 61 projecting into the slot 32 and which has a downwardly and inwardly tapering seating surface 62a adapted to mate with, and seal against, the annular valve seat 38. Just below the seating surface 62a, the valve member 60 is secured to, or formed integrally with, a movable internal cage 64 which, in the illustrated embodiment, is generally cylindrical in configuration, and is open at its lower end through an opening which is aligned with the outlet port 20 in the valve body 10 and with the opening through the valve seat 38. The movable internal cage 64 is further characterized in having a plurality of circumferentially spaced, axially extending radial ports 66 formed therein with at least three of said ports being provided and preferably four to eight of such ports. It will be noted in referring to FIGURE 1 that the diameter of the cylindrical, movable internal cage 64 corresponds to the diameter of the opening through the valve seat 38, and that the exterior wall of the movable internal cage bears against the valve seat during the reciprocation of the valve stem 52. It will also be noted that the radial ports 66 are arranged to face or oppose each other (see FIGURE 3), and that the distance from the valve member 60 to the lower end of the internal cage 64 is greater than the distance from the radially inwardly extending annular shoulder on the neck portion 34 to the valve seat 38.

A bonnet 68 is bolted or otherwise suitably secured to the valve body 10 around the stem opening 26 therethrough and bears against the shoulder formed on the upper stationary cage 40 at the junction between the relatively large diameter internal portion 42 of this cage and the small diameter neck portion 46 thereof. The bonnet 68 also carries a downwardly projecting key 69 which is received in a mating key slot formed partially in the valve body 10 and partially in the upper stationary cage 40 and functions to prevent the cage from turning in the valve body. The bonnet 68 serves to retain the upper stationary cage 40 in the proper position within the valve body, and to facilitate the removal of the internal portions of the valve located in the central chamber 18 by the simple act of removing the bolts which secure the bonnet 68 to the valve body.

For the purpose of reciprocating the stem means 50 in the valve body, a valve operator, which in the illustrated embodiment takes the form of a hand wheel 70, is threadedly engaged with the threaded stem 52 of the stem means, and includes a hub portion 72 which fits around, and engages, the upper end of the small diameter neck portion 46 of the upper stationary cage 40. Mating grooves are provided in the small diameter neck portion 46 and the hub portion 72 of the hand wheel 70 for the purpose of receiving ball bearings 74 which permit the hand wheel to be turned easily on the neck portion 46. An aperture is provided through the hub portion 72 of the hand wheel 70 to permit the ball bearings 74 to be inserted in their cooperating grooves, and a suitable threaded plug 76 is threaded into this aperture to close the aperture after the ball bearings are in position.

The operation of the throttling valve of the invention is best understood by referring to FIGURES 1 and 4 of the drawings. FIGURE 1 illustrates the valve in its fully closed position, and FIGURE 4 illustrates the valve in its fully opened position. Thus, when the valve is fully closed, the hand wheel 70 has been rotated on the small diameter neck portion 46 of the upper stationary cage 40 to cause the stem means 50 to move downwardly in the central chamber 18 of the valve body 10. This brings the seating surface 62a of the valve member 60 into sealing contact with the valve seat 38 and prevents flow of fluid through the valve. By reversing the direction of rotation of the hand wheel 70, the valve is opened by causing the stem means 50 to reciprocate upwardly in the central chamber 18 of the valve body 10. During reciprocation of the stem means 50, the smooth walled portion 52a of the stem 52 slides freely through the packing member 54 by which it is sealingly engaged. Simultaneously, the movable internal cage 64 bears slidingly against the valve seat 38 which is constructed of some relatively resilient material, such as rubber or a synthetic resin. It will thus be noted that the stem means 50 is supported in its reciprocating movement at two points spaced axially therealong and, most importantly, is confined, guided and supported adjacent its free lower end, where the movable internal cage 64 is located, by the valve seat 38 which constantly contacts this cage. This feature effectively damps out vibrations which would tend to be set up along the length of the stem 52, and prevents chattering of the valve as a result of the vibrating movement of this structural member.

Figure 3:
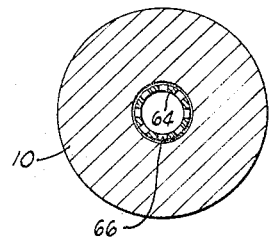
FIGURE 3 is a view in section taken along line 3—3 of FIGURE 1.

A second important feature of the valve which permits it to operate more effectively than throttling valves of this type as prevnously constructed in the positioning of the circumferentially spaced, radial ports 66 in the movable internal cage 64 carried on the lower end of the stem means 50. Because of the opposite disposition of a number of these ports around the wall of this cage as best illustrated in FIGURE 3, when this movable cage 64 is moved into a position of alignment with the fluid flow passageways 70 in the lower stationary cage 28, the fluid flowing through the valve passes through these several oppositely facing radial ports 66 and converges in the center of this internal movable cage. It will be seen that fluid entering through the several radial ports 66 moves on a convergent path and thus intersects the other streams entering this cage so that there is a dissipation of the kinetic energy in the fluid as it merges in the center of the cage. As a result of this convergence of the several fluid streams, and the dissipation of the energy therein, there is less propensity of the fluid to cut away or abrade the valve seats or other internal parts of the valve due to the high velocity of the fluid. Also, less strain is imposed on the stem means 50 by this self-damping action of the merging fluid streams, and there is a further reduction in the vibratory stresses set up within the valve.

Alternate embodiments of the throttling valve of the invention are illustrated in FIGURES 5 and 6. In these embodiments of the invention, reference numerals identical to some of those used in FIGURES 1-4 have been employed where identical structural elements are portrayed. The basic difference between the forms of the valve illustrated in FIGURES 5 and 6 from that which is shown in FIGURES 1-4 reside in the flow paths established through the valves, or the orientations of the valve operator or hand wheel 70 with respect to the valve body. It will be noted in FIGURE 5 that a so-called Y-type valve is provided in which the axis of the stem means 50 extends at about 45° to the axis of the flow path of fluid through the valve. In this arrangement, an inlet fitting 100 having a threaded bore 102 therethrough is secured to the side of the valve body 10 at an angle of about 45°. The threaded bore 102 communicates with the inlet port 16 of the valve body. The valve body 10, instead of the generally cylindrical outlet port 20 of the type provided in FIGURE 1, has an angular outlet port 104 which extends out of one side of the valve body and communicates with a threaded passageway 106 in a discharge fitting 108. The discharge fitting 108, like the inlet fitting 100, is secured to the valve body 10 at an angle of about 45° by welding or other suitable means. The operation of the Y-type valve depicted in FIGURE 5 is substantially identical to the operation which has been described as characterizing the embodiment of the invention depicted in FIGURES 1-4.

In FIGURE 6 of the drawings, another embodiment of the invention is illustrated in which the axis of the stem means again extends at about 45° to the axis of the flow path through the valve. In this embodiment, however, the valve body and inlet and outlet fittings adapting the valve for connection to threaded conduits, pipes or the like comprise an integrally formed structure and may be made as a single casting. Thus, the valve body is here designated generally as reference character 150 and includes a fluid inlet arm 152 having a threaded bore 154 therethrough and a fluid discharge arm 156 which is also provided with a threaded bore 158. The threaded bore 158 communicates with the opening through the valve seat 38 and is dimensioned to facilitate the reciprocation of the movable internal cage 64 therein. This embodiment of the valve is also operated in the manner characteristic of the valve depicted in FIGURES 1-4, and possesses the same advantages which have been described in referring to the earlier described embodiment.

From the foregoing description of the invention, it will have become apparent that the invention provides an improved throttling valve which is characterized in having a longer, defect-free service life, such extended service life resulting from the reduction of chattering or vibration in the internal moving elements of the valve, and the reduction or elimination of cutting or abrading of these internal elements and particularly the valve seat which tends to result when such a valve is used in high pressure service and a large pressure drop is established across the valve.

Although several embodiments of the invention have been herein illustrated and described, it will be apparent that certain modifications and innovations can be made in the depicted and described structure without departure from the basic principles which characterize the invention. For example, the valve stem means 50 can be reciprocated by a variety of mechanisms well-known in the art, and the invention is not limited to the employment of a hand wheel type valve operator as depicted in the drawings. Insofar as such modifications do not depart from these basic principles, they are deemed to be circumscribed by the spirit and scope of the invention except as the same may be necessarily limited by the appended claims or reasonable equivalents thereof.

I claim:
1. A throttling valve comprising:
   a valve body having a central chamber, a stem opening through said valve body into said central chamber, an inlet port opening through said valve body into said central chamber, and an outlet port opening into said central chamber from a direction oriented at substantially 90° to the direction said inlet port opens into said central chamber, and aligned with said stem opening;
   a stationary cage positioned in said central chamber and having a stem aperture aligned with the stem opening in the valve body, a discharge aperture at the opposite side of the cage from the stem aperture, fluid flow passageways positioned between the stem aperture and the discharge aperture, and a radially inwardly projecting, annular shoulder in said cage above said fluid flow passageways;
   a valve seat positioned in said central chamber in juxtaposition to said stationary cage and having an opening therethrough aligned with said discharge aperture and said outlet port;
   valve stem means reciprocably positioned in said central chamber and extending through said stem opening and stem aperture, said valve stem means including:
   a valve closure member having a larger diameter than said annular shoulder in said stationary cage and positioned to sealingly cooperate with said valve seat at one time during the reciprocating movement of said valve stem means, and
   a hollow, cylindrical, movable internal cage having a discharge opening at one end thereof in alignment with the discharge port in said housing, and having a second end of annular configuration secured to said valve closure member, said movable internal cage further having a plurality of circumferentially spaced radial ports in the side thereof between said one end and said second end of said movable cage, said radial ports being positioned for alignment with the fluid flow passageways in said stationary cage when said stem means is reciprocated, and said movable internal cage being dimensioned to bear against, and be guided by, said valve seat during the reciprocating movement of said stem means, the distance between said valve closure member and said one end of said movable internal cage being greater than the distance between said radially inwardly projecting annular shoulder of said stationary cage and said valve seat whereby said movable cage cannot be withdrawn through said valve seat, and guides thereupon and bears thereagainst at all time during operation of said valve; and
   valve operator means outside said valve body and cooperating with the valve stem means to reciprocate said stem means in said central chamber.

2. A throttling valve as defined in claim 1 and further characterized to include packing means in said central chamber sealingly surrounding said valve stem means at a point spaced from said valve closure member and cooperating with said seat in preventing vibration and chattering of said stem means when said valve is open.

3. A throttling valve as defined in claim 1 wherein said movable internal cage has at least four of said radial ports in the side thereof, and wherein said stationary cage is cylindrical in configuration and said flow passageways are located in the side thereof and positioned for alignment in a radial direction with the radial ports in said movable internal cage when said valve is opened.

4. A throttling valve as defined in claim 1 wherein said stationary cage includes an upper part and a lower part, said upper part having a neck portion extending through the stem opening in said body, and rotatably supporting said valve operator means.

5. A throttling valve as defined in claim 4 wherein the lower part of said stationary cage is cylindrical and said flow passageways are located in the side thereof, and said lower part of the stationary cage further includes a threaded neck portion engaging the upper part of the stationary cage, and wherein the upper part of said stationary cage has a threaded counterbore therein receiving the neck portion of the lower cage; and
   said valve being further characterized to include a packing member positioned in said counterbore and around said stem means and sealingly engaging the upper and lower parts of said stationary cage and said stem means.

6. A throttling valve as defined in claim 5 wherein said valve seat is contacted by said lower part of the stationary cage and is positioned around said stem means and between said stationary cage and said valve body.

7. A throttling valve as defined in claim 6 wherein said valve stem means includes an elongated valve stem connected at one end to said valve closure member and extending through the cylindrical lower part of said stationary cage, through said packing member and through a bore in the upper part of said stationary cage, which bore is aligned with, and communicates with, said counterbore.

8. A throttling valve as defined in claim 7 and further characterized to include bonnet means detachably secured to said valve body and retaining said stem means, stationary cage and valve seat in said central chamber.

9. A throttling valve as defined in claim 1 and further characterized to include a valve bonnet retaining said stationary cage and said stem means in said central chamber in the valve body.

10. A throttling valve as defined in claim 1 and further characterized to include an inlet fitting secured to said valve body and extending therefrom in a direction which defines an angle of about 45° with the direction of reciprocation of said stem means; and
    a discharge fitting secured to said valve body and extending therefrom in a direction which defines an angle of about 45° with the direction of reciprocation of said stem means.

11. A valve comprising:
    a valve body having a fluid flow passageway extending therethrough and turning through an angle of 90° in the valve body;
    a valve seat in said valve body and surrounding said fluid flow passageway at one place therealong;
    valve stem means reciprocably mounted in said valve body and including:
    an elongated valve stem aligned with that portion of said fluid flow passageway through the valve body which is surrounded at one place by said seat, said valve stem extending normal to a second portion of said fluid flow passageway which extends substantially normal to the portion of said fluid flow passageway which is surrounded at one place by said seat;
    a valve closure member on said elongated valve stem and positioned for sealing cooperation with said valve seat upon reciprocation of said valve stem means; and
    a movable internal hollow cage having first and second ends and secured at one of its ends to said elongated valve stem adjacent said valve closure member and dimensioned to bear against, and be guided by, said seat during reciprocation of said stem means, said movable internal cage having a fluid discharge opening in the other end thereof, and having a plurality of radial ports positioned in the sides thereof between the ends of said movable internal hollow cage, said radial ports being oriented to face each other and being generally aligned to receive fluid from said second portion of said fluid flow passageway whereby fluid streams entering the several radial ports converge in the center of said movable, internal hollow cage;

means in said valve body limiting reciprocation of said valve stem means to a distance less than the distance between said valve closure member and said other end of said movable internal hollow cage whereby said movable internal hollow cage bears against said valve seat at all times during the opening and closing motion of said valve; and packing means in said valve body sealingly surrounding and guiding said elongated valve stem, said packing means being spaced axially along said valve stem from said valve closure member by a distance which exceeds the length of the reciprocating stroke of said stem means between a fully opened and a fully closed position.

12. A valve as claimed in claim 11 wherein said valve seat is annular and said movable internal cage is cylindrical and is dimensioned and positioned to engage at its outer periphery, the annular valve seat, at all times during the reciprocating motion of said valve stem means.

13. A valve as claimed in claim 12 wherein said radial ports are six in number and extend axially in the cylindrical wall of said cylindrical movable internal hollow cage.

14. A throttling valve comprising:

a valve body having a central chamber, a stem opening through said valve body into said central chamber, an inlet port opening through said valve body into said central chamber, and an outlet port opening into said central chamber from a direction oriented at substantially 90° to the direction said inlet port opens into said central chamber and aligned with said stem opening;

a stationary cage positioned in said central chamber having a stem aperture aligned with the stem opening in the valve body, a discharge aperture at the opposite end of the cage from the stem aperture, fluid flow passageways positioned between the stem aperture and discharge aperture, and an axially extending keyway slot through the side of said cage and positioned between said fluid flow passageways and between said stem aperture and discharge aperture;

a valve seat positioned in said central chamber in juxtaposition to said stationary cage and having an opening therethrough aligned with said discharge aperture and said outlet port;

valve stem means reciprocably positioned in said central chamber and extending through said stem opening and stem aperture, said valve stem means including:

a valve closure member positioned to sealingly cooperate with said valve seat at one time during the reciprocating movement of said valve stem means;

a radially extending pin projecting from said valve closure member into said keyway slot; and a hollow, generally cylindrical, movable internal cage secured to said closure member and having a discharge opening at one end thereof in alignment with the discharge port in said housing, said movable internal cage further having a plurality of circumferentially spaced radial ports in the side thereof and positioned for alignment with the fluid flow passageways in said stationary cage when said stem means is reciprocated, said movable internal cage being dimensioned to bear against, and be guided by, said valve seat during the reciprocating movement of said stem means; and valve operator means outside said valve body and cooperating with the valve stem means to reciprocate said stem means in said central chamber.

References Cited

UNITED STATES PATENTS

| | | | |
|---|---|---|---|
| 517,575 | 4/1894 | Knapp et al. | 251—20 |
| 831,742 | 9/1906 | Pownall | 251—362 |
| 1,506,546 | 8/1924 | Oleson | 251—120 |
| 2,692,750 | 10/1954 | Davis et al. | 251—362 |
| 2,745,628 | 5/1956 | Carlson | 251—333 |
| 2,917,271 | 12/1959 | Banks | 251—362 |
| 2,963,038 | 12/1960 | Sharp | 137—454.6 |
| 2,994,343 | 8/1961 | Banks | 251—362 |
| 3,212,524 | 10/1965 | Caldwell | 251—120 |
| 3,269,698 | 8/1966 | Koch | 251—270 |

M. CAREY NELSON, *Primary Examiner.*

W. R. CLINE, *Assistant Examiner.*

U.S. Cl. X.R.

251—210